(12) United States Patent
Pollack

(10) Patent No.: US 8,516,116 B2
(45) Date of Patent: Aug. 20, 2013

(54) CONTEXT-BASED ROUTING OF REQUESTS IN A SERVICE-ORIENTED ARCHITECTURE

(75) Inventor: Robert H. Pollack, Philadelphia, PA (US)

(73) Assignee: Accenture Global Services Limited, Dublin (IE)

( * ) Notice: Subject to any disclaimer, the term of this patent is extended or adjusted under 35 U.S.C. 154(b) by 861 days.

(21) Appl. No.: 11/565,378

(22) Filed: Nov. 30, 2006

(65) Prior Publication Data

US 2008/0133755 A1    Jun. 5, 2008

(51) Int. Cl.
*G06F 15/173* (2006.01)
*G06F 15/16* (2006.01)

(52) U.S. Cl.
USPC ........... 709/225; 709/203; 709/224; 709/226; 709/228; 709/229

(58) Field of Classification Search
USPC ................. 709/201–203, 223–226, 238–244; 370/351, 357, 229–235
See application file for complete search history.

(56) References Cited

U.S. PATENT DOCUMENTS

| | | | | |
|---|---|---|---|---|
| 6,513,061 | B1 * | 1/2003 | Ebata et al. | 709/203 |
| 7,054,938 | B2 * | 5/2006 | Sundqvist et al. | 709/227 |
| 7,085,756 | B2 * | 8/2006 | Carey et al. | 707/3 |
| 7,174,363 | B1 * | 2/2007 | Goldstein et al. | 709/203 |
| 7,194,353 | B1 | 3/2007 | Baldwin et al. | |
| 7,209,915 | B1 * | 4/2007 | Taboada et al. | 707/3 |
| 7,415,435 | B1 * | 8/2008 | Weiss et al. | 705/37 |
| 7,747,720 | B2 * | 6/2010 | Toebes et al. | 709/223 |
| 7,860,968 | B2 * | 12/2010 | Bornhoevd et al. | 709/224 |
| 2002/0087674 | A1 * | 7/2002 | Guilford et al. | 709/223 |
| 2002/0174247 | A1 * | 11/2002 | Shen | 709/238 |
| 2003/0005078 | A1 * | 1/2003 | Turicchi et al. | 709/217 |
| 2003/0051042 | A1 * | 3/2003 | Tazoe | 709/229 |
| 2004/0019645 | A1 * | 1/2004 | Goodman et al. | 709/206 |
| 2004/0203759 | A1 * | 10/2004 | Shaw et al. | 455/433 |
| 2005/0050141 | A1 * | 3/2005 | An et al. | 709/203 |
| 2005/0078668 | A1 * | 4/2005 | Wittenberg et al. | 370/389 |
| 2005/0245230 | A1 * | 11/2005 | Benco et al. | 455/406 |
| 2005/0262192 | A1 * | 11/2005 | Mamou et al. | 709/203 |
| 2005/0273516 | A1 * | 12/2005 | Patrick et al. | 709/238 |
| 2006/0047742 | A1 | 3/2006 | O'Neill et al. | |
| 2006/0047813 | A1 * | 3/2006 | Aggarwal et al. | 709/226 |
| 2006/0053378 | A1 * | 3/2006 | Fano et al. | 715/747 |
| 2006/0173985 | A1 * | 8/2006 | Moore | 709/223 |
| 2006/0195565 | A1 * | 8/2006 | De-Poorter | 709/224 |
| 2006/0248593 | A1 * | 11/2006 | Dennis et al. | 726/26 |
| 2006/0277261 | A1 * | 12/2006 | Paramasivam et al. | 709/206 |
| 2007/0083642 | A1 * | 4/2007 | Diedrich et al. | 709/224 |
| 2007/0192431 | A1 * | 8/2007 | Liu | 709/217 |
| 2007/0192706 | A1 * | 8/2007 | Bruce et al. | 715/742 |
| 2008/0069082 | A1 * | 3/2008 | Patrick | 370/351 |

OTHER PUBLICATIONS

Ten-Hove, et al., "Java Business Integration (JBI) 1.0", Aug. 17, 2005, chs. 3, 4, and 5 (pp. 5-58), Sun Microsystems, Inc., Santa Clara, California.

\* cited by examiner

*Primary Examiner* — Luat Phung
*Assistant Examiner* — Kai Chang

(57) ABSTRACT

Context-based routing of requests in a service-oriented architecture (SOA) is achieved by using context information received from service providers to make routing decisions. Service providers publish information about their context on a publish-and-subscribe channel. A router (e.g., a JBI normalized message router) subscribes to the channel to receive the context information, and may store the context information in a context repository. A consumer issues a service request specifying a context, and the router uses the context information received from the service providers to select the service provider that best satisfies the context. The request is then routed to the selected service provider.

19 Claims, 4 Drawing Sheets

CONTEXT-BASED ROUTING OF REQUESTS IN A SERVICE-ORIENTED ARCHITECTURE

BACKGROUND

Service-oriented architectures (SOAs) are systems that support interactions between two kinds of software entities: service providers, which provide services, and consumers, which use these services. Typically, a consumer issues a message containing a request for a service, and a component within the SOA selects a provider for that service. In some cases, the SOA contains a router that, in addition to selecting a provider, also forwards the request message to the selected provider.

SOAs exist in which a provider can be selected based on information contained in the message. However, it would be desirable for a provider to be selected based on information about the provider's context. (The provider's location is one example of a type of context.) Moreover, it would be desirable to add to an existing system, such as one based on Java Business Integration (JBI), functionality to select a provider based on context.

SUMMARY

The subject matter described here provides context-based routing within a system such as a SOA. Service providers publish their context information (e.g., their location) on a publish-and-subscribe channel. A router subscribes to this channel to receive the context information, and may store the received context information in a context repository. A consumer issues a request for service that specifies a context, and the router compares the received context information with the context specified in the request in order to select a provider for the service. The request is then routed to the selected provider.

In one example, the subject matter described herein provides one or more computer-readable storage media encoded with executable instructions that are loadable into a first router to cause the first router to perform acts comprising: subscribing to a facility, where each of a plurality of service providers publishes information descriptive of its context through said facility; receiving a request for a service, said request specifying a first context; receiving, through said facility, the information published by said plurality of service providers descriptive of the service providers' contexts, whereby the information that is received constitutes received context information; selecting a first one of said plurality of service providers based on a comparison of said received context information with said first context; and routing said request to said first one of said plurality of service providers.

In another example, the subject matter described herein provides an apparatus comprising: one or more processors; one or more data retention devices; a first routing module that comprises instructions that are executable on at least one of said processors and that are stored in at least one of said data retention devices, wherein said first routing module subscribes to a facility through which each of a plurality of service providers publishes information descriptive of the service providers' contexts, receives, through said facility, the information published by said plurality of service providers descriptive of the service providers' contexts, whereby the information that is received constitutes received context information, selects a first one of said plurality of service providers based on a comparison of said received context information with said first context, and routes said request to said first one of said plurality of service providers.

In another example, the subject matter described herein provides a method of using a first one of a plurality of providers to provide a service to a consumer, the method comprising: publishing over a channel, by each of said plurality of providers, context information descriptive of a context associated with each of said plurality of providers; subscribing, by a first router, to said channel so that said router receives said context information; issuing, by said consumer, a request for said service, said request specifying a first context; determining by said first router, based on a comparison of said first context with said context information, that said first one of the plurality of providers satisfies said first context better than the other ones of said plurality of providers; routing, by said first router, said request to said first one of the plurality of providers; and providing, by said first one of the plurality of providers, said service.

Other features are described below.

DETAILED DESCRIPTION

Overview

Figure 1:
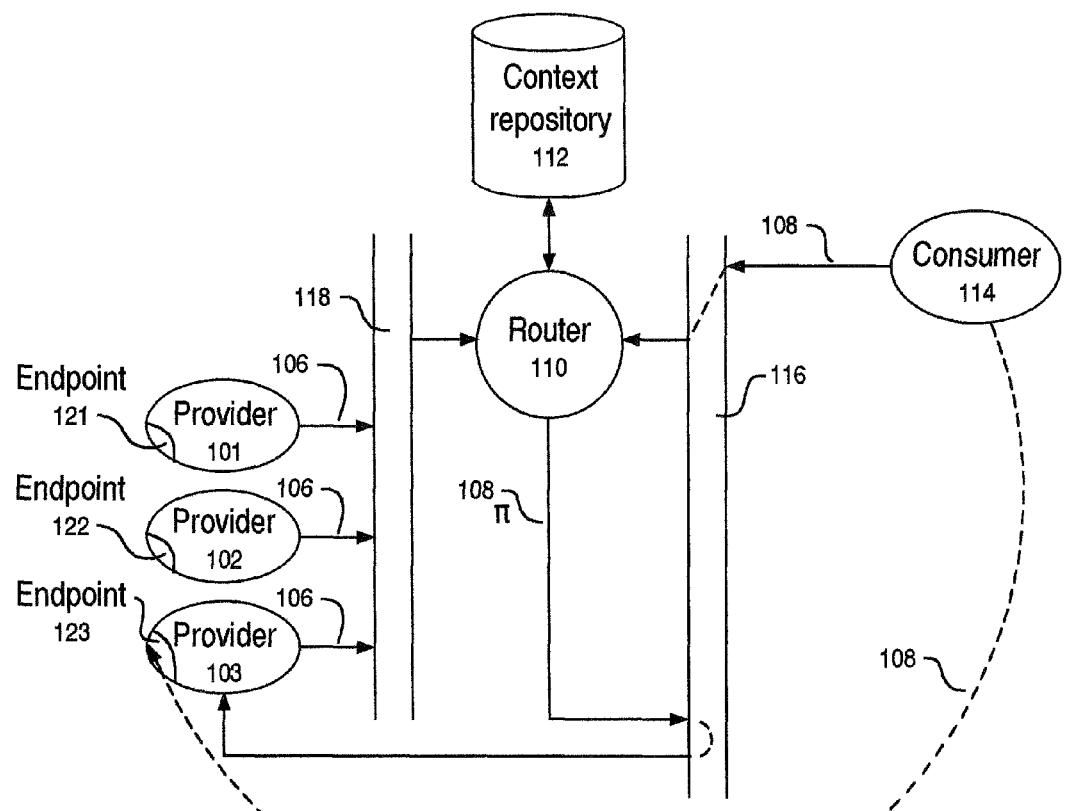
FIG. 1 is a block diagram of a first scenario in which requests may be routed to providers.

Service-oriented architectures (SOAs) are systems that support interactions between two kinds of software entities: service providers, which provide services, and consumers, which use these services. The exchange of data between producers and consumers is in the form of messages. The service offered by any individual providers is usually defined by a service contract, specifying what response the producer will send in answer to a request message sent by a consumer. For example, a producer might provide current stock market prices; its contract might define that if it receives a message containing the ticker symbol of a stock, it will return a message containing the current share price of that stock. The current practice of SOAs includes formally defined languages for expressing such contracts, most notably the Web Services Definition Language (WSDL).

A job of a SOA is to connect consumers with suitable providers. In some examples of a SOA, this connection is often accomplished by the consumer's specifically contacting the provider at some known Internet address. In such a case, the SOA is simply some collection of mechanisms to help the consumer discover this address, and does not participate in the exchange.

Other examples of SOAs, however, mediate the exchange between the two entities by locating the provider's address, based on some identifier supplied by the consumer. The Java Business Integration (JBI) specification is one example of a standard for constructing such SOAs. As known to those in the relevant field, several implementations of JBI are available.

The JBI standard distinguishes abstract services from concrete service implementations. An abstract service is one that conforms to a particular contract. A concrete service implementation is a physical entity that provides the service and which is reachable through a service endpoint. An endpoint may be specific Internet addresses that would permit location by any Internet entity, or it may be a symbol that is only meaningful to the JBI system itself.

JBI implementations are required to have an entity called the "router," whose job is to direct consumer requests to suitable service providers. Two particular tasks of the router are to determine the endpoint of a provider and to find a handler that can transmit the request in the protocol specified by that endpoint. A JBI consumer can request a specific endpoint, or it can specify only the name of the service contract, leaving the router to choose the endpoint. If the endpoint is omitted, the router is free to choose the endpoint of any provider of the specified service.

A "provider instance" is a specific implementation of a service provider. A provider instance may take the form of particular machine code executed by a particular physical computer. Typically, each provider instance is associated with a particular endpoint, although there is not necessarily a one-to-one correspondence between endpoints and provider instances, since a provider instance could have more than one endpoint.

A provider instance typically has properties that are not shared by other providers of the same service. For example, a provider instance may be characterized by the physical location of the computer on which it is running. Properties such as physical location can be of great importance in systems that contain many providers of the same service. A military network, for example, may have a large number of aircraft, each of which provides surveillance reports conforming to the same service contract; the report from an aircraft at location X, however, is of different value, and has a different significance, from one at location Y.

The term "service provider context" refers to a collection of properties that belong to specific service provider instances. While JBI routers can supply provider endpoints, they presently do not base the selection of an endpoint on provider context. For example, it would be desirable for a consumer to be able to request a report from an aircraft at location X. In this case, "location X" is an example of a context, and it would be desirable to allow the router to choose the endpoint based on which provider is at or near location X. A router that can support such requests is described herein.

Some properties may require the provider's continued cooperation—e.g., in the location example above, the provider should recurrently transmit its location, since the location can change frequently. In other examples, however, the information is either relatively static, or is information that is knowable without direct communication from the provider. For example, the context information for a provider instance might include its average response time. A router could keep track of the response time of each endpoint and use this information to route requests that demand a certain level of performance. Other context information, however, such as the provider's "location" in the example above, may be known only to the provider instance. The subject matter described herein provides a mechanism by which such information can be made known to routers.

Example Request-Routing Scenarios

FIG. 1 shows an example scenario in which a request may be routed to a provider.

Router 110 routes requests from a consumer 114 to one of a plurality of providers 101, 102 and 103. A "normalized message router" (NMR) of a JBI system is an example of router 110. A consumer 114 submits request 108 to router 110. The router then identifies a provider to which to route request 108. Request 108 is then routed to the selected provider (provider 103, in this example) via message channel 116.

Each of providers 101, 102 and 103 is associated with an endpoint 121, 122, and 123, respectively. An endpoint is essentially an address that router 110 can use to route messages to a particular provider. In the example of FIG. 1, each endpoint uniquely identifies a particular provider, and vice versa. However, the endpoint and the provider are conceptually distinct, and there need not be a one-to-one correspondence between providers and endpoints.

Providers 101, 102, and 103 publish their context information 106 via publish-and-subscribe channel 118. Publish-and-subscribe channel 118 is preferably independent of the JBI system. In particular, a JBI system may provide message channel 116, and publish-and-subscribe channel 118 is preferably independent of message channel 116. An application programming interface (API) may be provided by which providers 101, 102, and 103 may publish their context information to publish-and-subscribe channel 118.

Router 110 subscribes to channel 118, and continually collects context information 106 through channel 118.

Router 110 stores context information 106 in context repository 112. Router 110 may later retrieve context information 106 from context repository 112 in order to use context information 106 as part of routing decisions. Context repository 112 preferably stores, for each provider, both context information 106 and at least one endpoint. The physical location of a provider is an example of context information that context repository 112 may store for a particular provider.

An API may be provided that router 110 may use to collect context information from channel 118, and to store context information in context repository 112.

For example, if consumer 114 wishes to make a context-based request (e.g., if consumer 114 requests service X from a provider located near point Y), consumer 114 sends a request 108 to router 110, where request 108 specifies not only a service that consumer 114 wishes to obtain, but also a particular context. Router 110 examines the context specified in request 108, and using previously-received context information (which is preferably stored in context repository 112), selects an endpoint corresponding to a provider instance with the correct context (or that most closely satisfies the correct context). The request is then routed to the selected provider. The selected provider then provides the requested service.

Figure 2:
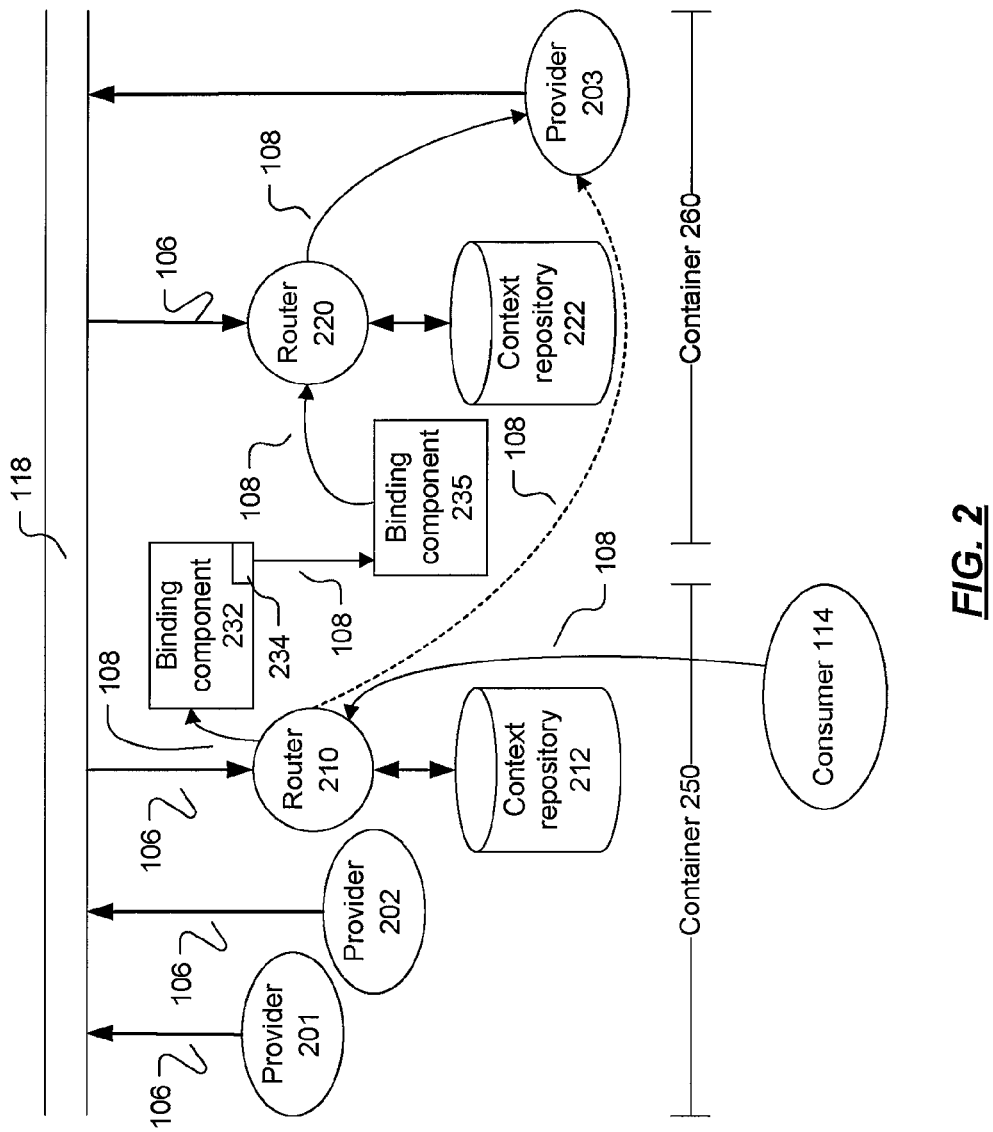
FIG. 2 is a block diagram of a second scenario in which requests may be routed to providers.

FIG. 2 shows a second example scenario in which a request may be routed to a provider. Two containers 250 and 260 (which may be JBI containers) are shown. Router 210 and providers 201 and 202 are within (e.g., registered to) container 250. Router 220 and provider 203 are within container 260. In one example, a provider is visible to a router within the same container as that provider, but not to a router outside of that container. For example, the endpoint associated with a particular provider may have a meaning only to the router within that provider's container.

It is advantageous for a provider in one container to be accessible to a router in a different container. Since many publish-and-subscribe systems are implemented on wide-area networks such as the Internet, both context information and endpoints can be shared across container boundaries. Thus, publish-and-subscribe channel 118 is available to providers and routers in both container 250 and in container 260. Each provider 201, 202, and 203, can publish its context information 106 over publish-and-subscribe channel 118, thereby making the context information available to routers in a container other than the one that the provider is associated with. Moreover, a provider can use publish-and-subscribe channel 118 to publish endpoint information, which can be used by a router in a different container. Each router 210, 220 is preferably associated with a corresponding context repository 212, 222. A context repository may be used (in addition to the purposes described above) to store endpoint information about providers that are outside of a given container. E.g., router 220 in container 260 may receive context and endpoint information about providers 201, 202 registered with container 250; router 220 may store this context and endpoint information in context repository 222.

In the example of FIG. 2, consumer 114 issues a request 108 that specifies a context, and request 108 is processed by router 210. Router 210 determines (e.g., based on previously-received context information) that provider 203 best satisfies the context specified in request 108. Router 210 then arranges for request 108 to be routed to provider 203, which is outside of router 210's container 250.

In a JBI system, a function of a router is to identify an endpoint to which a request is to be sent, and a JBI normalized message router (NMR) is designed to route a request to an endpoint that is visible to that router, which conventionally means an endpoint within that router's container. Thus, a binding component 232 may be designed to handle requests that the router needs to route outside of its own container, and the binding component 232 may be assigned an endpoint 234 that is usable within the router's container. (A binding component is essentially a JBI implementation of what could otherwise be called a "handler.") Thus, endpoint 234 is associated with binding component 232, and is usable by router 210. When router 210 determines to route a request to a provider outside of container 250, router 210 directs the request to endpoint 234. The request is then received by binding component 232, which can then arrange to send the request to its actual destination (e.g., provider 203). For example, if provider 203 is accessible by Internet without the need for a JBI container, binding component 234 may simply direct the request to the Internet Protocol (IP) address associated with provider 203. But if provider 203 is situated in another container 260, that container 260 provides its own binding component 235, whose job is to receive remote requests through a non-JBI protocol and forward the requests to the router 220 of container 260, so that the requests may be forwarded to a provider within container 260, such as provider 203. Binding component 232 can be said to forward a request to a provider, regardless of whether binding component 232 forwards the request directly (as in the example where binding component 232 directs the request to the provider's IP address), or if binding component 232 forwards the request to some intermediary (e.g., binding component 235) for further forwarding. The protocol between binding component 232 and binding component 235 may be any protocol they have agreed on, and their connectivity may or may not be via the Internet. In FIG. 2, request 108 is shown by dotted line as being routed from router 210 to provider 203; the solid lines that show request 108 traveling from router 210, to binding component 232, to binding component 235, to router 220, to provider 203, is one way of implementing the path that is shown by the dotted line.

Example Contents of Context Repository

Figure 3:
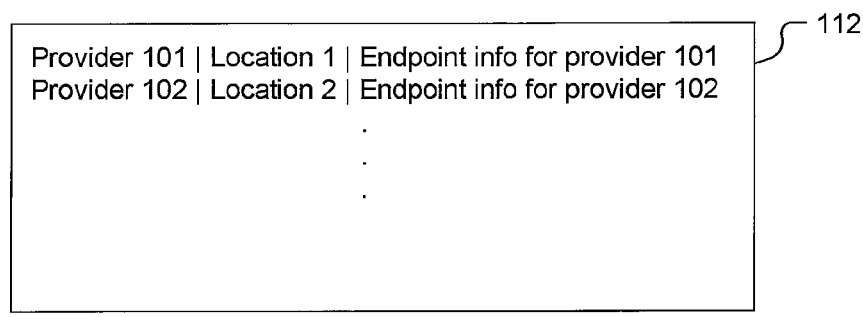
FIG. 3 is a block diagram of an example context repository and its contents.

FIG. 3 shows example contents of a context repository 112. As noted above, a context repository associates a provider with context information and endpoint information for that provider. Thus, context repository 112 contains an entry for provider 101, which shows the most recent location information ("location 1") for provider 101, and also shows the endpoint information associated with provider 101. Similarly, context repository 112 contains an entry for provider 102, which shows the most recent location ("location 2") for provider 102, and also shows the endpoint information associated with provider 102. Context repository 112 may contain similar entries for other providers. "Location" information is an example of a type of context that may be stored for a particular provider, although other types of context information could also (or alternatively) be stored in context repository 112. Endpoint information can, for example, be a container-specific endpoint that has meaning within a particular container, or it could be a global endpoint that is addressable outside the context of a particular container. (E.g., an IP address for a provider is an example of a global endpoint.)

While context repository 112 (from FIG. 1) is shown, similar information may be stored in context repositories 212, 222 from FIG. 2.

Example Request

Figure 4:
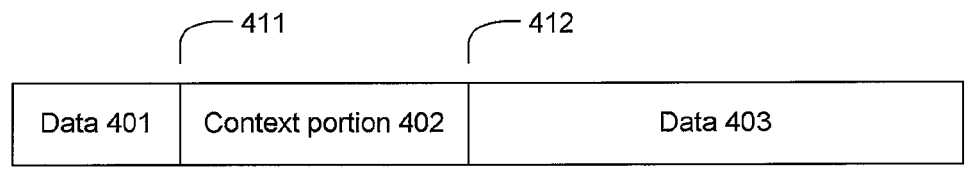
FIG. 4 is a block diagram of an example request

FIG. 4 shows an example request 108. Request 108, in this example, comprises first data 401, a context portion 402, and second data 403. The context specified by a particular request 108 is defined by context portion 402.

A standard may specify the location within a given message where the specification of context is to be located. This location may be defined in various ways. For example, in the example of FIG. 4, the context portion 402 is shown as occupying the space between two offsets (411, 412) into the message.

The standard that specifies the location of the context specification can be agnostic as to the format or content of the context itself. In one example, context information could be specified in XPath, which is an Extensible Markup Language (XML) query language. However, it is possible for the standard to specify that the context specification will be located at a particular place in the message that contains the request, without specifying the format of what will be contained at that location.

A standard may, for example, be a published standard or other specification that defines behavior, interfaces, data, etc., for a particular type of system.

Example Process in Which Requests Are Routed Based on Context

Figure 5:
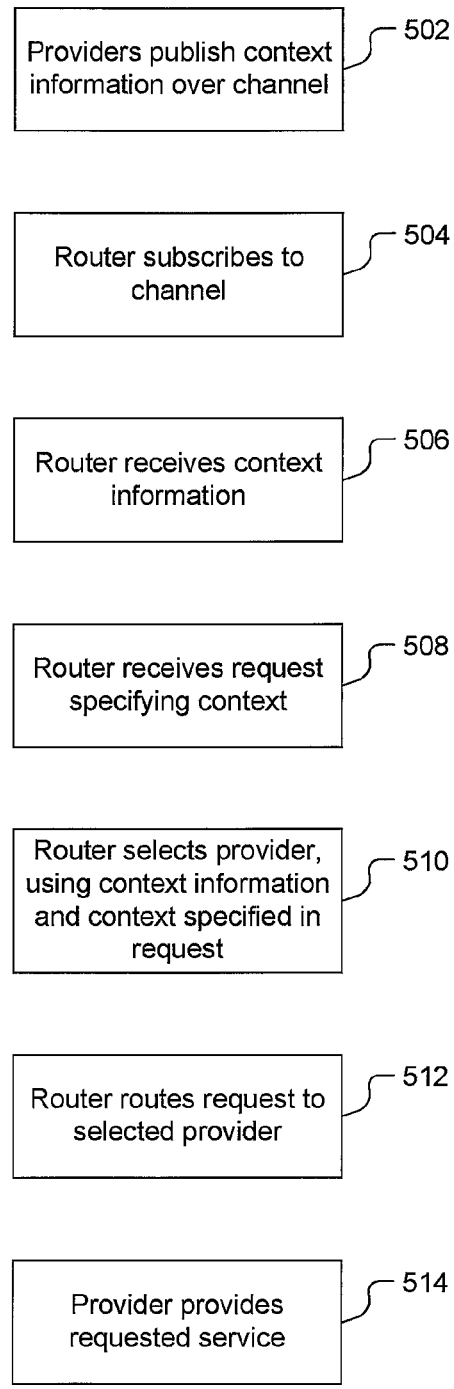
FIG. 5 is a flow diagram of an example process in which the subject matter described herein may be carried out.

FIG. 5 shows example actions that may be carried out in a process performed in the scenarios described above.

At 502, providers (such as providers 101, 102, and 103, shown in FIG. 1, or providers 201, 202, and 203, shown in FIG. 2) publish their respective context information over a channel (such as publish-and-subscribe channel 118), shown in FIGS. 1 and 2.

At 504, a router (such as routers 110, 210, and 220, shown in FIGS. 1 and 2) subscribes to the channel. At 506, the router receives context information via the channel. Optionally, the router may store the received context information in a context repository.

At 508, the router receives a request for service. The request 108 that is received from consumer 114 (as shown in FIGS. 1 and 2) is an example of the kind of request for service that may be received. Such a request contains a specification of a context that is relevant for the requested service.

At 510, the router selects a provider to which to route the request. This selection may be made based on the context specified in the request and the previously-received context information. The router may consult a context repository to learn the most recent context information for the relevant service providers.

At 512, the router routes the request to the selected service provider.

At 514, service provider that was selected to receive the request provides the requested service.

Example Implementations

The subject matter described herein can be deployed in existing systems that support message routing, such as systems conforming to JBI. In one example, the system in which the subject matter is to be deployed provides a router that can make a routing decision based on information contained in the request, but that does not provide a mechanism to collect context information about providers and to use that information in routing decisions. In such a case, a publish-and-subscribe channel, and a mechanism by which providers can publish their context information, can be added to such a system. Additionally, program code can be loaded into the router to enable the router to receive and use the context information. In one example, the router has some functionality that is defined by a standard, where that standard calls for the router to be able to select a particular service provider, but does not call for the router to be able to do so by comparing context information specified in a request with the service providers' actual context. In this case, the router is essentially enhanced by loading into it instructions that allow the router to take context into consideration in making routing decisions.

Program code to enable the router to receive and use context information (as well as program code to perform any other functionality described herein) can be stored on one or more computer-readable media (e.g., optical or magnetic disk, tape, semi-conductor memory, etc.), and then loaded into the computing device that implements such a router. The use of such media to store and load such program code is generally known in the relevant field.

Aspects of the subject matter described herein may be deployed in an apparatus that comprises one or more processors (e.g., one or more central processing units), and/or one or more data-retention devices (e.g., disks, tapes, semi-conductor memories, etc.). For example, a router may be implemented in the form of such an apparatus, by storing program code in one or more of the data-retention devices, and by causing the stored code to execute on one or more of the processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. One or more non-transitory computer-readable storage media encoded with executable instructions that are loadable into a first router to cause said first router to perform acts comprising:
    subscribing to a facility, where each of a plurality of service providers publishes first information descriptive of its context through said facility;
    receiving a request from a consumer, said request comprising second information describing a service that said consumer seeks to obtain and specifying a physical location from which said service is to be obtained;
    receiving, through said facility, said first information published by said plurality of service providers, wherein said first information that is received comprises Internet addresses of said service providers, information describing services provided by said service providers, and physical locations of said service providers;
    selecting an Internet address for a first service provider of said plurality of service providers based on a satisfactory comparison between: i) said second information included in said request describing said service and ii) said first information received at said facility describing a service provided by said first service provider, said selecting also based on a satisfactory comparison between: iii) said second information included in said request specifying said physical location and iv) said first information received at said facility comprising a physical location of said first service provider; and
    routing said request to said Internet address for said first service provider, wherein said first service provider is operable for providing a response to said request.

2. The one or more non-transitory computer-readable storage media of claim 1, wherein said first router is within a first container, wherein those ones of said plurality of service providers that are located outside of said first container do not have endpoints addressable by said first router, wherein said first service provider and a second router different from said first router are within a second container different from said first container, and wherein said act of routing said request to said first service provider comprises: routing said request to a component that is associated with a first endpoint, said first endpoint being addressable by said first router, wherein said component forwards said request to said first service provider.

3. The one or more non-transitory computer-readable storage media of claim 1, wherein said acts further comprise: storing said first information that is received in a data store.

4. The one or more non-transitory computer-readable storage media of claim 1, wherein said acts further comprise: retrieving said second context information from said request by examining data at a pre-defined location within said request, said pre-defined location having been designated by a standard.

5. The one or more non-transitory computer-readable storage media of claim 1, where said first router has a range of functionality defined by a standard that calls for said first router to be able to select one of said service providers, but does not call for said first router to be able to select one of said service providers by comparing said first information for said service providers with said second information in said request, and wherein loading of said executable instructions into said first router enables said router to perform said selecting act.

6. The one or more non-transitory computer-readable storage media of claim 1, wherein said physical location of said first service provider is closer to said physical location specified in said request than physical locations of other ones of said service providers.

7. The one or more non-transitory computer-readable storage media of claim 1, wherein said request also specifies a type of service and said first provider satisfies said request better than the other ones of said plurality of service providers because said first provider both provides said type of service and is located closer to said physical location specified in said request than said other ones of said service providers that also provide said type of service.

8. The one or more non-transitory computer-readable storage media of claim 1, wherein said service providers are mobile, wherein said service providers transmit said physical locations recurrently to said facility.

9. An apparatus comprising:
one or more processors;
one or more data retention devices;
a first routing module that comprises instructions that are executable on at least one of said processors and that are stored in at least one of said data retention devices, wherein said first routing module: subscribes to a facility through which each of a plurality of service providers publishes first information descriptive of said service providers' context; receives, through said facility, said first information published by said plurality of service providers, wherein said first information that is received comprises Internet addresses of said service providers, information describing services provided by said service providers, and information that describes physical geographical locations of said service providers; selects an Internet address for a first service provider based on a physical geographical location that is specified in a request from a service consumer, said request comprising second information describing a service that said consumer seeks to obtain and specifying a physical location from which said service is to be obtained, wherein said first service provider is selected based on a satisfactory match between: i) said second information included in said request describing said service and ii) said first information received at said facility describing a service provided by said first service provider, and also based on a satisfactory match between: iii) said second information included in said request specifying said physical location and iv) said first information received at said facility comprising a physical location of said first service provider; and routes said request to said Internet address for said first service provider, wherein said first service provider is operable for providing a service in response to said request.

10. The apparatus of claim 8, wherein said first routing module is associated with a first container, wherein those ones of said plurality of service providers that are not associated with said first container do not have Internet addresses addressable by said first routing module, wherein said first service provider and a second routing module different from said first routing module are associated with a second container different from said first container, and wherein said first routing module routes said request to said first service provider by routing said request to a component that is associated with said Internet address for said first service provider, wherein said component forwards said request to said first service provider.

11. The apparatus of claim 9, further comprising: a data store; wherein said first routing module stores said first information that is received in said data store.

12. The apparatus of claim 9, wherein said first routing module retrieves said second information from said request by examining data at a pre-defined location within said request, said predefined location having been designated by a standard.

13. The apparatus of claim 9, wherein said service providers are mobile, wherein said service providers transmit said physical locations recurrently to said facility.

14. A method of accessing a first provider, said method comprising:
publishing over a channel, by each provider of a plurality of providers, first information descriptive of a context associated with each of said providers and comprising Internet addresses of said providers, information describing services provided by said service providers, and physical locations of said providers;
subscribing, by a first router, to said channel so that said router receives said first information;
issuing, by a consumer, a request comprising second information describing a service that said consumer seeks to obtain and specifying a physical location from which said service is to be obtained;
selecting an Internet address for a first provider of said plurality of providers based on a satisfactory match between: i) said second information included in said request describing said service and ii) said first information received at said facility describing a service provided by said first provider, said selecting also based on a satisfactory match between: iii) said second information included in said request specifying said physical location and iv) said first information received at said facility comprising a physical location of said first provider;
routing, by said first router, said request to said Internet address for said first provider; and
providing, by said first provider, said service.

15. The method of claim 14, wherein said first router is within a first container, wherein those ones of said plurality of providers that are not within said first container do not have endpoints addressable by said first router, wherein said first provider and a second router different from said first router are associated with a second container different from said first container, and wherein said act of routing comprises: routing said request to a component that is associated with a first endpoint, said first endpoint being addressable by said first router, wherein said component forwards said request to said provider.

16. The method of claim 14, further comprising: storing said first information in a data store, wherein said determining act comprises retrieving said first information from said data store.

17. The method of claim 16, further comprising: interrogating, by said first router, said first context information stored in said data store to obtain for said first router said Internet address associated with said first provider.

18. The method of claim 14, wherein said first router retrieves said second information from said request by examining data at a pre-defined location within said request, said pre-defined location having been designated by a standard as a location for said second information.

19. The method of claim 14, wherein said providers are mobile, wherein said providers transmit said physical locations recurrently to said facility.

* * * * *